US011024340B2

(12) United States Patent
DeFranco

(10) Patent No.: US 11,024,340 B2
(45) Date of Patent: Jun. 1, 2021

(54) AUDIO SAMPLE PLAYBACK UNIT

(71) Applicant: Synesthesia Corporation, Los Angeles, CA (US)

(72) Inventor: Vincent DeFranco, Los Angeles, CA (US)

(73) Assignee: SYNESTHESIA CORPORATION, Los Angeles, CA (US)

( * ) Notice: Subject to any disclaimer, the term of this patent is extended or adjusted under 35 U.S.C. 154(b) by 0 days.

(21) Appl. No.: 16/935,480

(22) Filed: Jul. 22, 2020

(65) Prior Publication Data
US 2020/0349980 A1 Nov. 5, 2020

Related U.S. Application Data

(63) Continuation of application No. PCT/US2019/014190, filed on Jan. 18, 2019.

(60) Provisional application No. 62/620,556, filed on Jan. 23, 2018.

(51) Int. Cl.
G06F 3/16 (2006.01)
G10H 7/00 (2006.01)
G11B 27/10 (2006.01)
G06F 9/38 (2018.01)
G06F 9/48 (2006.01)

(52) U.S. Cl.
CPC ............... G11B 27/10 (2013.01); G06F 3/16 (2013.01); G06F 9/3802 (2013.01); G06F 9/3836 (2013.01); G06F 9/3867 (2013.01); G06F 9/48 (2013.01)

(58) Field of Classification Search
CPC ............... G10H 7/00; G10H 2240/145; G10H 2250/641; G10H 7/10; G10H 1/183; G06F 3/16
See application file for complete search history.

(56) References Cited

U.S. PATENT DOCUMENTS

| 4,868,869 A | * | 9/1989 | Kramer | G10H 1/0091 381/61 |
| 5,886,276 A | * | 3/1999 | Levine | G10H 1/0058 704/209 |
| 6,018,118 A | * | 1/2000 | Smith | G10H 1/0066 84/600 |
| 6,121,532 A | * | 9/2000 | Kay | G10H 1/00 84/445 |

(Continued)

OTHER PUBLICATIONS

International Search Report and Written Opinion for PCT/US2019/014190 dated Aug. 9, 2019.

Primary Examiner — Marlon T Fletcher
(74) Attorney, Agent, or Firm — Thompson Coburn LLP

(57) ABSTRACT

Disclosed herein are a number of example embodiments for an improved audio sample playback unit. For example, multi-dimensional mapping of triggers to audio samples is disclosed. Also disclosed is low latency retrieval and playback of audio samples via pre-loading of sample heads into high speed memory. Furthermore, disclosed herein is a multi-threaded control operation for generating audio frames in response to trigger inputs, as well as the use of multiple pipes from which audio data can be generated. Further still, an example embodiment provides for multi-level control of audio properties, including voice-specific controls, pipe-specific controls, and global controls.

25 Claims, 17 Drawing Sheets

(56) References Cited

U.S. PATENT DOCUMENTS

| | | | |
|---|---|---|---|
| 7,915,514 B1* | 3/2011 | Shrem | G10H 1/02 |
| | | | 84/645 |
| 2007/0209498 A1* | 9/2007 | Lindgren | G10H 1/361 |
| | | | 84/609 |
| 2008/0190271 A1* | 8/2008 | Taub | G10H 1/0058 |
| | | | 84/645 |
| 2009/0205480 A1* | 8/2009 | Kulkarni | G10H 7/02 |
| | | | 84/609 |
| 2009/0205481 A1* | 8/2009 | Kulkarni | G10H 1/0075 |
| | | | 84/609 |
| 2010/0031804 A1 | 2/2010 | Chevreau et al. | |
| 2010/0107855 A1* | 5/2010 | Riopelle | G10H 1/0025 |
| | | | 84/600 |
| 2012/0312145 A1 | 12/2012 | Kellett et al. | |
| 2015/0025664 A1 | 1/2015 | Cory et al. | |

* cited by examiner

```
/**
 * @brief voice structure that contains a head filled with begining of
 * a sample, a tail to be filled with remainder of sample, and a number
 * of settings and parameters
 */
struct voice_t {
    /*
     * pos is a float
     * this is so that it can be advanced between whole ineger frames
     * for variable rate playback, i.e. change the pitch of the sample
     */
    float pos;                      // playback position (in frames)
    float pitch;                    // playback rate, can range from 0.5x to 2.0x speed struct voice_t *next;           // pointer to next active voice
    struct voice_t* *parent;        // pointer to previous active voice struct stereo_control_t knobs;  // struct containing pan and volume
    struct tail_t *tail;            // pointer to sample tail
    struct head_t *head;            // pointer to sample head
    uint32_t uuid;                  // unique id for each active voice
    uint32_t timestamp;             // incrementing counter for each new voice volatile int queued;            // ensure a voice is never double queued
    volatile bool stop;             // used to signal mixer to stop active voice
    volatile bool eof;              // signal that tail has reached end of file
    volatile bool underrun;
};
```

Figure 14

```
/**
 * @brief Take a sample number and fetch a new voice, complete with head
 * and tail buffers, to playing that sample. Then feed that sample to the
 * mixer.
 * @param global_data Pointer to global data structure
 * @parma pipe Pipe number to assign new voice (0 through 3)
 * @parma fx Play through pipe FX route (true) or clean route (false)
 * @parma sample_num Index of sample to play (0 through 10799)
 * @parma pitch Playback speed (0.5 to 2.0)
 * @parma knobs Struct with pan (-1.0 to 1.0) and volume (0.0 to 1.0)
 * @return Pointer to new active voice on success, NULL on failure
 */
struct voice_t *sample_dispatcher (struct global_data_t *global_data,
                                    uint32_t pipe, bool, fx, uint32_t sample_num,
                                    float pitch, struct stereo_control_t knobs,
                                    int voice_id)
```

Figure 15

```
/**
 * @brief A four element array of linked fx_list_t shared with
 * mixer_thread ( ). Each array element corresponds to a pipe. The
 'next'
 * member of each fx_list_t optionally points to another fx_list_t.
 */
struct fx_list_t pipe_fx_list [] = {
      { .effect = fx_dummy, .content = NULL, .next = NULL },
      { .effect = fx_dummy, .content = NULL, .next = NULL },
      { .effect = fx_dummy, .content = NULL, .next = NULL },
      { .effect = fx_dummy, .content = NULL, .next = NULL },
};
```

Figure 16

AUDIO SAMPLE PLAYBACK UNIT

CROSS-REFERENCE AND PRIORITY CLAIM TO RELATED PATENT APPLICATION

This patent application is a continuation of PCT patent application PCT/US2019/014190, filed Jan. 18, 2019, and entitled "Audio Sample Playback Unit", which claims priority to U.S. provisional patent application Ser. No. 62/620,556, filed Jan. 23, 2018, and entitled "Improved Audio Sample Playback Unit", the entire disclosures of each of which are incorporated herein by reference.

INTRODUCTION

The inventors believe that there is a need in the art for improvements with respect to audio sample playback units such as synthesized electronic musical instruments so that they are better able to closely replicate "analog" musical instruments. The inventors believe that shortcomings exist in the art with respect to a number of technical areas, including but not limited to (1) the latency by which samples are played in response to inputs that trigger such samples, (2) flexibility with respect to replicating a wide array of sounds and instruments, and (3) producing sonically diverse and rich sounds in response to input triggers. In this context, the term "latency" refers to the period of time that an apparatus needs to process an audio signal in order to produce an audible output. If the latency is too high, a user will notice an undesirable lag between any input (e.g., recording a guitar signal, playing a software instrument via a MIDI keyboard, etc.) and the respective output (e.g., monitoring the recording in real-time, listening to the output of the software-based instrument). If the apparatus is not able to provide the amount of processing power or appropriately engineered design that is needed to complete all audio calculations sufficiently fast, there will be glitches in the audio playback.

Toward these ends, the inventors disclose a number of example embodiments of improved audio sample playback units.

For example, the inventors disclose an audio sample playback apparatus comprising: (1) a memory configured to store (i) a plurality of audio samples, and (ii) a mapping data structure for the audio samples, the mapping data structure configured to associate the audio samples with at least one trigger parameter, and (2) a processor configured to (i) receive trigger inputs, and (ii) for each of a plurality of the received trigger inputs, (a) determine at least one trigger parameter from the received trigger input, (b) access the mapping data structure to identify a triggered audio sample associated with the determined at least one trigger parameter, (c) retrieve the identified triggered audio sample from the memory, and (d) generate an audio frame based on the retrieved triggered audio sample. The mapping data structure may comprise a multi-dimensional array that associates the audio samples with a plurality of trigger parameters (such as trigger position, trigger velocity, round robin position, or other trigger parameters) to efficiently locate the appropriate audio samples for playback while providing a rich set of sounds for the apparatus.

As another example, the inventors disclose an audio sample playback apparatus comprising: (1) a first memory configured to store a plurality of heads for a plurality of audio samples, (2) a second memory configured to store a plurality of tails for a plurality of the audio samples, and (3) a processor configured to, in response to an audio sample being triggered, retrieve the head for the triggered audio sample from the first memory and begin playback of the retrieved head prior to retrieval and playback of the tail for the triggered audio sample from the second memory. The first memory can be a high speed memory such as RAM, while the second memory can be a low speed memory such as a disk. By permitting the processor to retrieve and begin playback of audio sample heads from the high speed memory while retrieving the audio sample tails from the low speed memory, the apparatus is able to generate audio at reduced latency because head playback can begin quickly while tail retrieval is performed in the background.

As yet another example, the inventors disclose an audio sample playback apparatus comprising: (1) a memory configured to store a plurality of audio samples, and (2) a processor configured to (i) retrieve audio samples from the memory in response to triggers, (ii) assign triggered audio samples to a plurality of pipes, and (iii) generate audio frames from the pipes based on the retrieved audio samples, wherein each pipe has independently adjustable control settings for audio properties to be applied to audio samples within the pipes. In this context, each pipe refers to a pipeline of execution (among multiple pipelines of execution). The processor can further be configured to (1) assign triggered audio samples to a plurality of voices, and (2) assign the voices to the pipes, wherein each voice has independently adjustable control settings for audio properties to be applied to audio samples assigned to the voices. Such pipe-specific and voice-specific audio controls provide users with deeply granular control over every individual note played, which further enhances the depth of sound that the apparatus can produce.

Still further, as another example, the inventors disclose an audio sample playback apparatus comprising: (1) a memory configured to store a plurality of audio samples, and (2) a processor configured to concurrently execute a plurality of threads to generate audio frames in response to triggers, wherein the threads include (1) a first thread for assigning triggered audio samples to voices, (2) a second thread for mixing audio from a plurality of active voices, (3) a third thread for retrieving at least portions of the triggered audio samples from the memory, and (4) a fourth thread for framing the mixed audio. The distribution of tasks across these multiple threads also reduces latency for audio sample playback in response to trigger events.

Various corresponding methods and computer program products are also disclosed herein.

Through these and other features, example embodiments of the invention provide significant technical advances in the art by harnessing computer technology to improve how sound is electronically produced from audio samples stored in computer memory.

BRIEF DESCRIPTION OF THE DRAWINGS

FIG. 14 discloses an example voice structure.

FIG. 15 discloses example dispatcher code for a dispatcher thread.

FIG. 16 discloses an example pipe structure.

DETAILED DESCRIPTION OF EXAMPLE EMBODIMENTS

Figure 1:
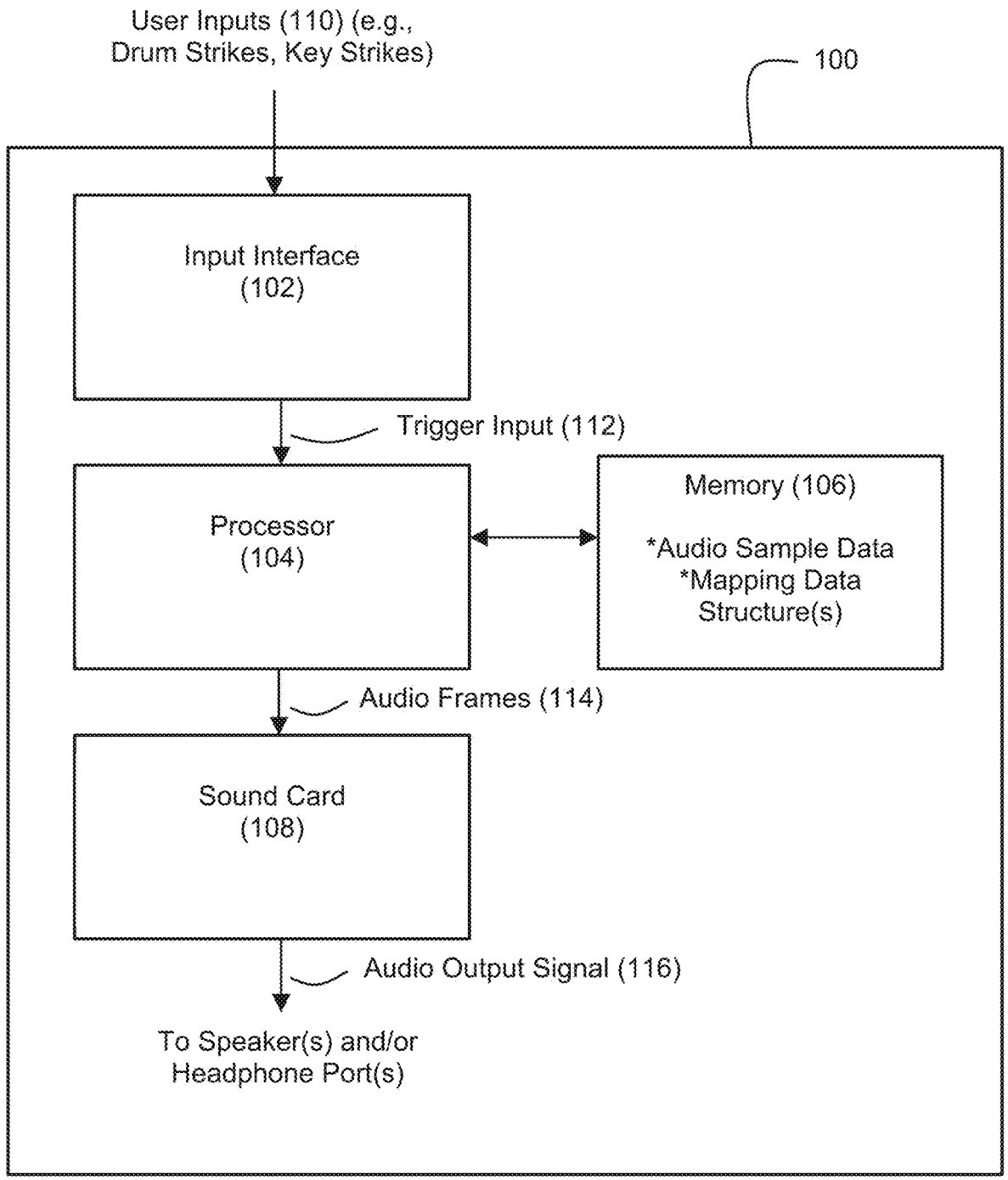
FIG. 1 discloses an example audio sample playback unit in accordance with an example embodiment.

FIG. 1 discloses an example audio sample playback unit 100. The audio sample playback unit 100 can take the form of a synthesized electronic musical instrument; for example, an electronic drum, an electronic keyboard (piano, organ, etc.), and the like. The audio sample playback unit 100 generates audio output in response to user input, and the audio sample unit 100 may comprise an input interface 102, processor 104, memory 106, and sound card 108. The components of the audio sample unit 100 can be enclosed in a housing with any of a number of form factors. For example, the housing can be shaped to replicate a musical instrument such as a drum, keyboard, etc. However, it should also be understood that the housing need not be shaped to replicate a musical instrument—for example, the components could be housed more generally in a computer system (e.g., laptop computer, tablet computer, desktop computer) or sound board.

The input interface 102 translates user inputs 110 into input triggers 112. The input interface can take any of a number forms. For example, the input interface 102 can include a user interface (UI) through which user inputs 110 are received. Such a UI can be a graphical UI (GUI), such as a GUI touchscreen. For example, a GUI touchscreen can visually depict a keyboard, and the input interface 102 can detect the locations of user touches on the GUI touchscreen and translate those locations into trigger inputs 112 reflective of the key strike locations (or notes corresponding to those key strike locations). As another example, the UI can be designed to receive drum strikes (such as from a drumstick or hand), and the input interface 102 can detect the locations of drum strikes for use as trigger inputs 112. However, it should also be understood that the input interface 102 can connect with peripheral devices such as a musical controller that provides user inputs 110 in the form of electronic signals representative of note or sound selections.

Processor 104 and memory 106 cooperate to generate audio frames 114 from the trigger inputs 112. The processor 104 may comprise one or more processors such as general-purpose processors (e.g., a single-core or multi-core microprocessor), special-purpose processors (e.g., an application-specific integrated circuit or digital-signal processor), programmable-logic devices (e.g., a field programmable gate array), etc. that are suitable for carrying out the operations described herein. In an example embodiment, it is preferred that the processor 104 be capable of executing several threads simultaneously. The memory 106 may comprise one or more non-transitory computer-readable storage mediums, such as volatile storage mediums (e.g., random access memory, registers, and/or cache) and/or non-volatile storage mediums (e.g., read-only memory, a hard-disk drive, a solid-state drive, flash memory, and/or an optical-storage device). The memory 106 may also be integrated in whole or in part with other components of the unit 100. Further, the memory 106 may be local to the processor 104, although it should be understood that the memory 106 (or portions of memory 106) could be remote from the processor 104, in which case the processor 104 may access such remote memory through an interconnect or the like.

Memory 106 may store software programs or instructions that are executed by processor 104 during operation of the unit 100. For example, the memory 106 may store the programs for the process flows discussed below, which can take the form of a plurality of instructions configured for execution by processor 104. The memory 106 may also store audio sample data, which can take the form of a plurality of audio samples. The samples can be audio files in any of a number of audio file formats, such as .wav and .aiff. The audio sample data and files can be uncompressed audio. Each sample can correspond to a different note or sound that can be produced by the unit 100. The memory 106 may also store one or more mapping data structures for use by the processor 104 when mapping trigger input-related data to audio samples. This mapping data structure can allow the processor to quickly locate and access an audio sample in response to the user input 110.

During operation, the processor 104 translates the trigger inputs 112 into trigger data that gets mapped to audio samples in the memory 106 via the mapping data structure, and the processor 104 then generates audio frames 114 from these mapped audio samples.

The sound card 108 converts the audio frames 114 into an audio output signal 116 that can be provided to a speaker and/or headphone so that a user can hear the sounds that are responsive to the user inputs 110. The sound card 108 can have a corresponding driver that links the sound card 108 with the processor operations. As an example, the sound card 108 can take the form of a digital to analog converter (DAC) for audio data.

Figure 2A:
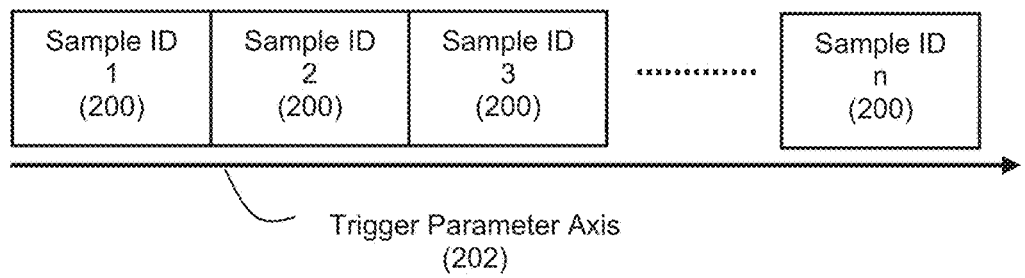
FIGS. 2A and 2B show examples of how audio samples can be mapped to trigger parameters.
Figure 2B:
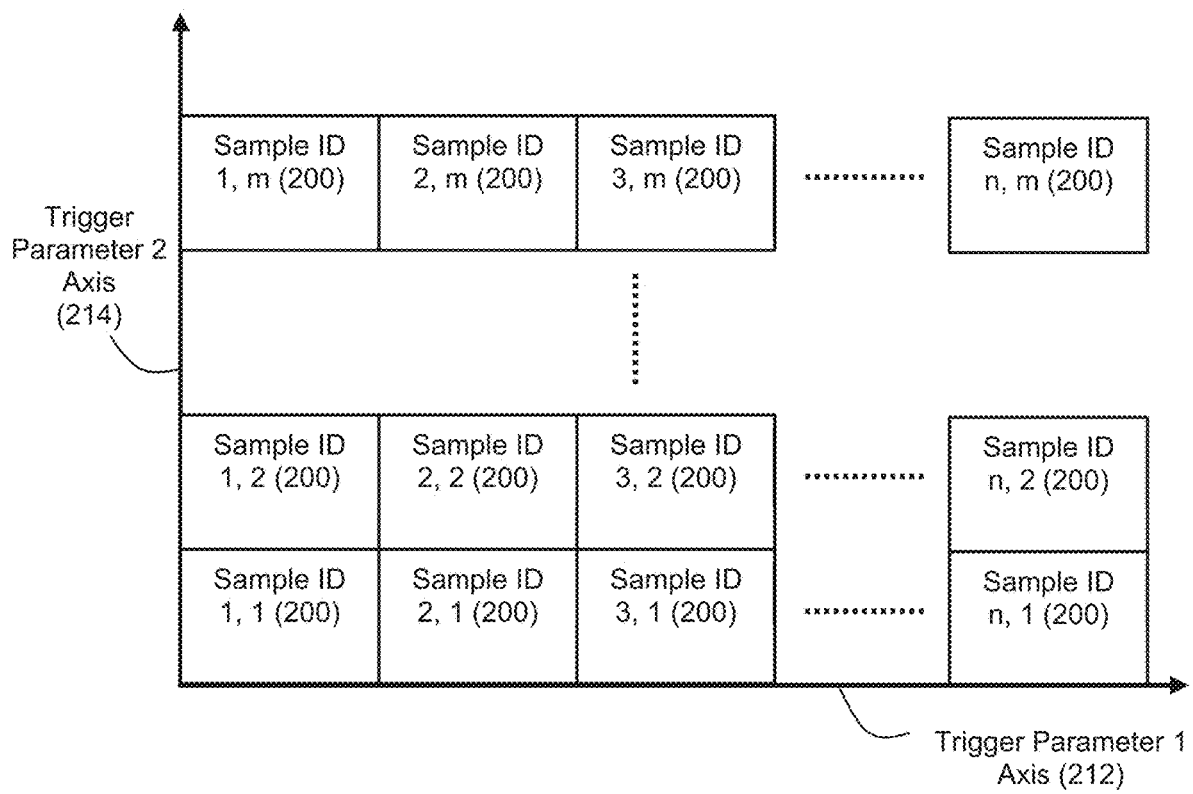

FIGS. 2A and 2B show examples of how audio samples can be mapped to trigger data. The audio samples can correspond to sounds with different audio characteristics. The trigger data can be represented by one or more trigger parameters. Examples of trigger parameters can include note or sound identifiers, characteristics of input 110 (such as input note, input velocity, modulation 'mod' wheel position, input duration, and the like), etc. Velocity is a term of art that relates to the force with which a note is struck, which in turn can influence how loud the sound will be. To permit the system to select an appropriate audio sample in response to a given input 110, the memory 106 can maintain a mapping data structure that associates audio sample identifiers 200 with one or more trigger parameters, as shown by the examples of FIGS. 2A and 2B. The example of FIG. 2A shows a one-dimensional mapping where each audio sample identifier 200 is associated with a value along trigger parameter axis 202. Each audio sample identifier 200 can correspond to a different audio sample in the memory 106 and can be represented by data that serves to identify the corresponding audio sample, such as a memory address where the corresponding audio sample can be found. The mapping data structure could also employ one or more layers of indirection such as a naming convention to identify samples (for example, a multi-byte code unique to each sample (e.g., a 16 byte code)). The trigger parameter axis 202 can be a parameter such as a note, in which case Note 1 gets mapped to Sample ID 1, Note 2 gets mapped to Sample ID 2, and so on.

However, for a more robust sound arrangement, the audio samples can be associated with multiple trigger parameters; an example of which is shown by FIG. 2B. For example, the first trigger parameter axis 212 can identify a note number, while the second trigger parameter axis 214 can identify an input characteristic such as an input velocity (e.g., to replicate the variable response of a musical instrument to the being struck relatively harder or softer). For example, a musical instrument digital interface (MIDI) note number can be used as a trigger parameter axis, as can MIDI velocity, and MIDI controller values. Thus, in an example embodiment where the unit 100 is a synthesized electronic musical instrument such as an electronic drum, the audio sample that gets selected when the electronic drum is struck twice in the same location can vary based on how hard the electronic drum was struck at that same location. Thus, FIG. 2B shows an example of a multi-dimensional mapping data structure for mapping audio samples to multiple trigger parameters in order to yield a unit 100 that can produce richer sound in response to inputs 110. Moreover, while the example of FIG. 2B shows a two-dimensional mapping data structure, it should be understood that additional dimensions can be provided by further associating the audio samples with additional trigger parameters.

Also, while FIGS. 2A and 2B show plots of audio sample identifiers across trigger parameter dimensions for ease of illustration, it should be understood that the mapping data structure can take any of a number of forms. For example, the mapping data structure can take the form of one or more data structures in memory 106 such as lookup tables, linked lists, relational database tables, hashing tables, etc.

Figure 3:
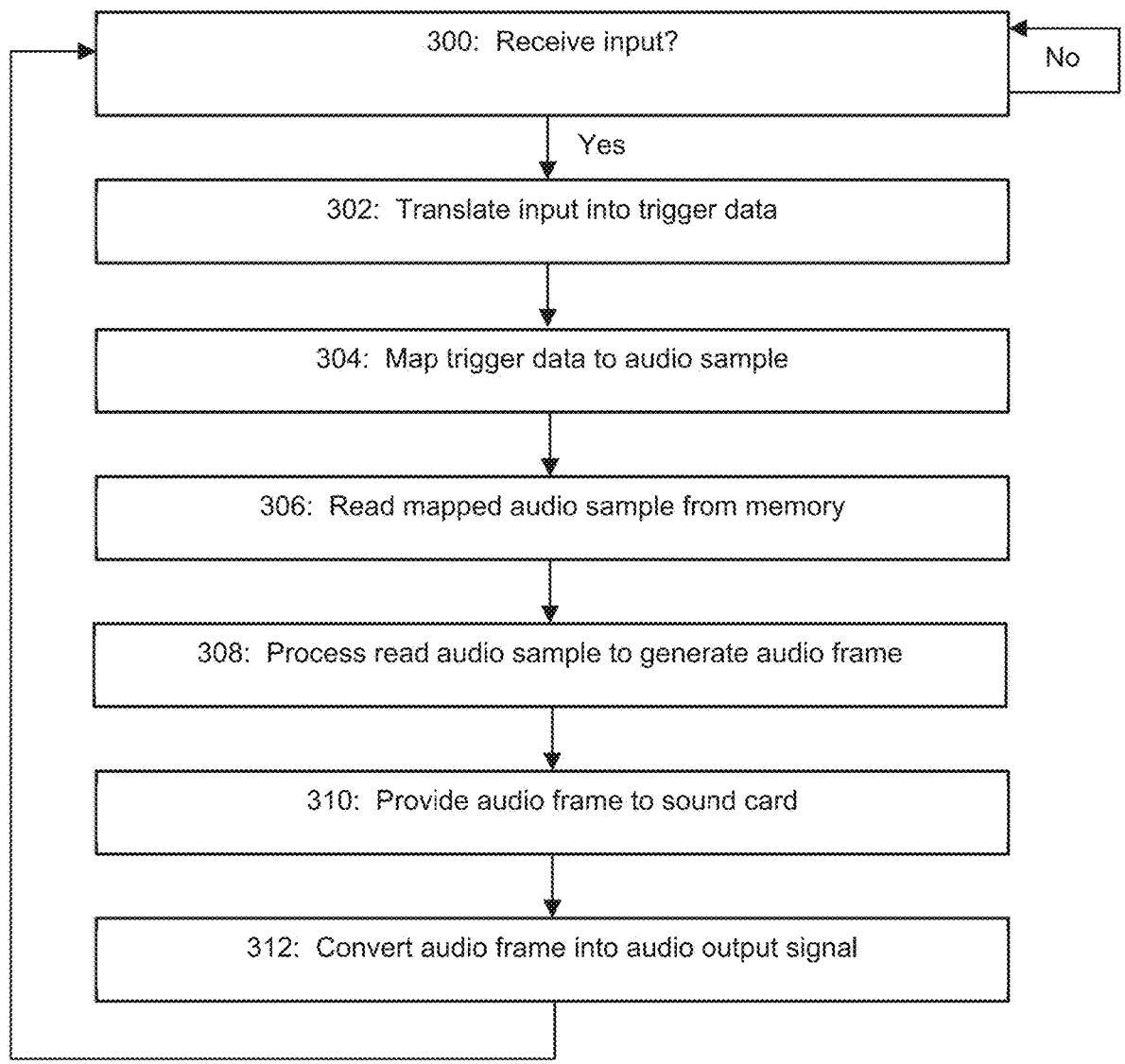
FIG. 3 depicts an example process flow for an example embodiment of an audio sample playback unit.

FIG. 3 depicts an example process flow for an audio sample playback unit 100. If user input 110 is received at step 300, the process flow proceeds to step 302. At step 302, the user input 110 is translated into trigger data. As mentioned above, the user input 110 may take the form of a "touch" at a particular location on a touchscreen user interface, and the input interface 102 may produce a trigger input 112 that reflects this input location. The processor 104 can then determine a musical note or sound that corresponds to this input location. Such translation can be performed based on a mapping of input locations on the touchscreen user interface to identifiers for notes or sounds. However, it should be understood that the input interface 102 could also be configured to detect additional characteristics of the user input 110, such as an input velocity, input duration, etc. Such detection of additional characteristics can be performed by way of a UI-programmed interpretation of incoming data such as MIDI data or it can be done by way of a UI circuit and UI programming that detects varying voltage levels coming from analog equipment such as an analog modular synthesizer control voltage and trigger voltage outputs. Accordingly, it should be understood that the trigger input 112 can also include data that reflects such additional input characteristics. If the user input 110 takes the form of an input file provided to unit 100 from a music controller or the like, then step 302 can operate to translate the sequence of note entries in the input file into a sequence of trigger data. The trigger data produced at step 302 can identify an identifier for a note (e.g., a musical note), and it may also identify additional information such as velocity, duration, etc. Examples of scenarios where the trigger data includes additional information are described below.

At step 304, the processor 104 maps the trigger data to an audio sample in the memory 106. The mapping data structure(s) maintained in memory 106 can assist the processor in this regard by associating audio samples with parameters of trigger data. Thus, the processor 104 can map one or more trigger data values to an audio sample identifier 200 as shown by FIGS. 2A and 2B.

At step 306, the processor 104 reads the mapped audio sample from memory 106. The sample identifier 200 determined at step 304 can assist the processor 104 in this regard. For example, the sample identifier 200 can identify the memory address where the relevant audio sample is located.

At step 308, the processor 104 processes the audio sample read at step 306, and generates an audio frame 114 in response to this processing. It should be understood that the audio sample identifiers 200 can also be associated with additional metadata that defines a variety of control settings for controlling the playback of the subject audio sample. Examples can include control variables for audio parameters such as pitch, volume, pan, etc. Pan is a measure of how much of an audio signal is sent to the left or right side of the full audio field. A hard pan left can result in only sound from a left speaker, while a hard pan right can result in only sound from a right speaker, and a center pan can result in an equal amount of signal to the left and right sides. The processor 104 can use this associated metadata to control how the audio sample is rendered into an audio frame 114 based on such audio parameters. Also, as explained below, step 308 may also include a mixing operation where a new audio sample is mixed in with other audio samples that are currently being played.

At step 310, the processor 104 provides the audio frame 114 to sound card 108. This can be achieved by passing the audio frame 114 to a driver for the sound card 108. Thereafter, at step 312, the sound card 108 converts the audio frame 114 into an audio output signal 116 that can be heard via one or more speakers and/or headphones.

Figure 4A:
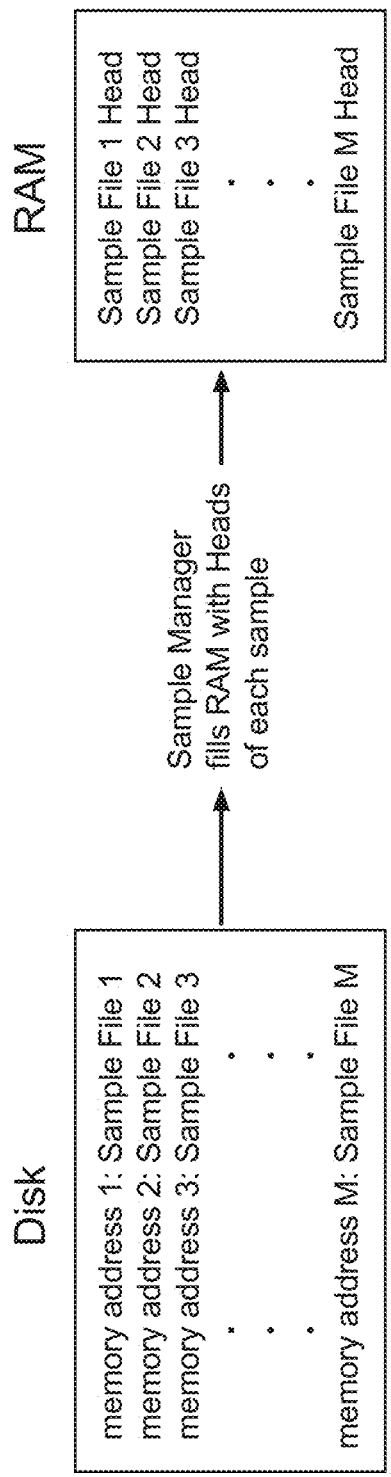
FIG. 4A shows an example of how sample head data can be pre-loaded from low speed memory such as a disk into high speed memory such as RAM to reduce playback latency.

As mentioned above, improvements to playback latency while maintaining a rich sound is something for which the inventors believe there is a need in the art. To provide a diverse base of potential sounds for the unit 100, the size of the audio sample data in memory 106 is expected to be large, and the unit 100 will need to be able to quickly respond to a user input 110 to locate and playback an audio sample each time the unit 100 is triggered with new user inputs 110. This poses a technical problem for system designers; and as a solution to this technical problem, the inventors disclose an example embodiment where portions of audio samples are stored in high speed memory for faster access by the processor 104. FIG. 4A shows an example of such an embodiment where the head portions of audio samples are stored in a high speed memory such as a random access memory (RAM) from which the processor 104 can read at low latency. The head portion of an audio samples can be the beginning portion of the sample (e.g., the first 65 KB of the sample). The remainder of the sample (the tail portion) would remain in low speed memory (such as a disk), and the processor 106 would access the tail portion of the sample while playback of the head portion may have already begun. It should be understood that the head portion could be a portion that is longer or shorter than the first 65 KB of the sample. A factor that a practitioner can use when choosing how large to make the head portion is how long the system will take to identify the appropriate tail to retrieve from low speed memory and then beginning to retrieve and mix the identified tail from the low speed memory. Thus, when selecting how large to make the head portion, a tradeoff arises where (1) including too much sample in the head portion can lead to wasted time and higher latency from trigger to initial audio output, but (2) including too little sample in the head portion can cause underruns because the tail may not be ready for audio output when the end of the head portion playback is reached (which may cause undesirable audible digital clicking). The inventors believe that, for an example embodiment, the size of the head portion can be any value in a range from around the first 20 KB of a sample to around the first 120 KB of the sample.

In FIG. 4A, the low speed memory is shown by way of example as a disk on which audio samples in the form of various sample files are stored at various memory addresses. Each sample file can include a head portion and a tail portion. A sample manager program executed by the processor 104 can be configured to fill the high speed memory (shown in the example of FIG. 4A as RAM) with the head portions of each sample file. Thus, the head portions of audio samples are accessible to processor 104 at a lower latency than the tail portions of the audio samples, and the playback process can start playing audio sample heads from the high speed memory while still retrieving and processing the sample tails from low speed memory.

Figure 4B:
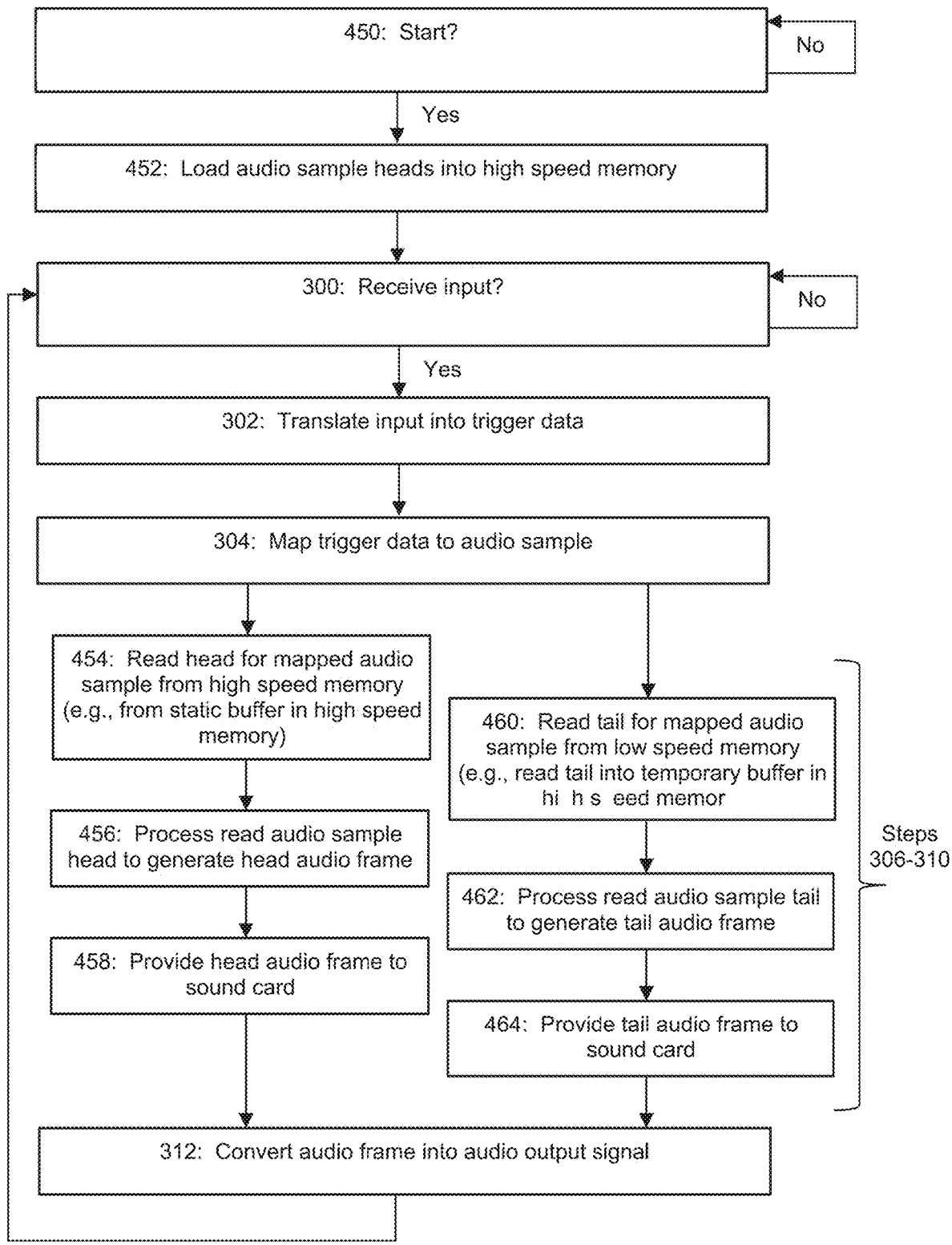
FIG. 4B depicts another example process flow for an example embodiment of an audio sample playback unit that uses the sample heading pre-loading technique of FIG. 4A.

FIG. 4B shows an example process flow for audio sample playback where sample heads are pre-loaded into high speed memory. After start up (step 450), the sample manager executed by processor 104 loads the sample file heads into RAM from disk at step 452 (and associates the sample file heads with sample identifiers or the like that allow for fast look up of sample file heads when needed). As an example, the sample manager can know the memory address of each sample file on the disk by way of a library for reading and writing sample files, for example the widely used C library called libsndfile. For each such memory address, the sample file head is loaded into RAM. At step 452, the sample manager can also check the files in the sound file library on the disk to see if all files are valid sound files, check file sizes (in case a sample's full length is shorter than an expected for a standard head size), and allocate buffer space in RAM for each sample file in the library. Thereafter, steps 300-304 can proceed as described above in connection with FIG. 3.

Steps 306-310 from FIG. 3 would then be performed in a manner where audio sample heads are read from the high speed memory (e.g., from a static buffer in the high speed memory) while the audio sample tails are read from the low speed memory. These tails can then be written into the high speed memory, such as in a separate and temporary buffer in the high speed memory. Thus, after the trigger data has been mapped to audio sample at step 304, the process flow can (1) read the sample head for the mapped audio sample from the high speed memory (see step 454), (2) process the read audio sample head to generate the head portion of an audio frame (see step 456), and (3) provide the head portion of the audio frame to the sound card (see step 458). While steps 454-458 are being performed, the processor 104 can also (1) read the tail for the mapped audio sample from the low speed memory into the high speed memory (see step 460), (2) process the read audio sample tail to generate the tail portion of an audio frame (see step 462), and (3) provide the tail portion of the audio frame to the sound card (see step 464). The sound card would then convert audio frames 114 into audio sound output 116 as discussed above. In this way, the unit 100 can quickly begin playback of the head portions of audio samples while using the available additional time to access and playback the tail portions of audio samples.

While the example of FIG. 4A shows an example where memory 106 includes a low speed memory in the form of a disk and a high speed memory in the form of RAM, it should be understood that other types of low and high speed memory could be employed. For example, flash memory could be used as the low speed memory rather than disk memory. The memory speeds can be reflective of the relative speeds by which a processor can read data from such memories. It is generally expected that a non-volatile memory external to processor 104 such as a disk or other physical memory device (e.g., a USB memory stick) will be slower with respect to data reads by a processor than a volatile memory internal to processor 104.

The inventors also disclose that playback latency can be improved through the use of threading where various playback tasks can be distributed among different processing threads that are executed concurrently by one or more processors capable of multi-threaded operation. An example of a multi-threaded approach to sample playback is shown by FIG. 5.

Moreover, to further improve playback latency while retaining rich sound, the inventors also disclose an example embodiment where the unit 100 processes samples into multiple pipes from which audio can be concurrently produced. In example embodiments, each pipe can have its own independently configured audio controls, which further enhances the robustness of the produced sound, particularly when the samples themselves have their own controllable audio control settings.

Figure 5:
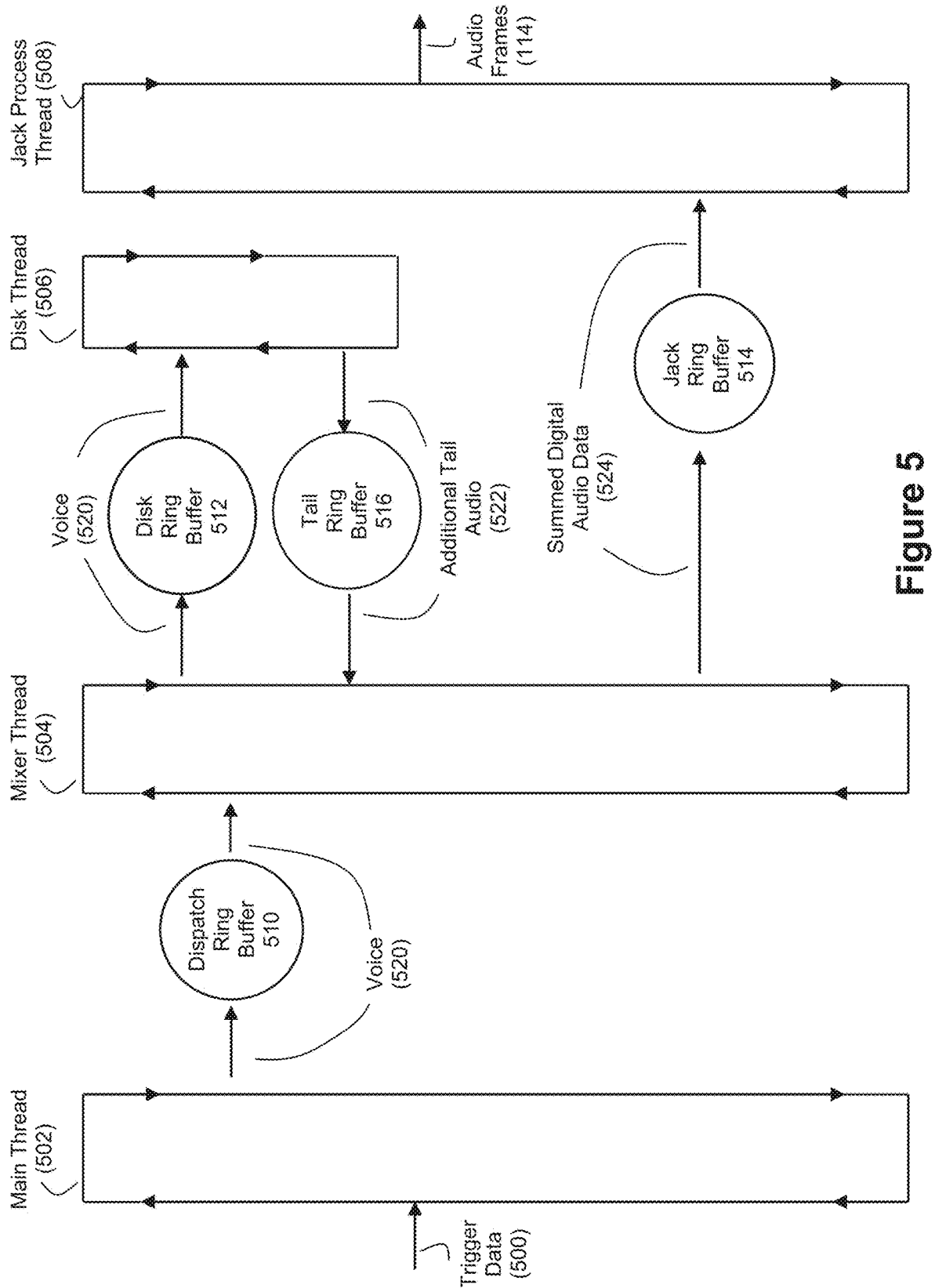
FIG. 5 shows an example embodiment of a multi-threaded control process for an example embodiment of an audio sample playback unit.

FIG. 5 shows how the unit 100 can employ multiple threads to process audio samples through multiple pipes in response to user input. The processor 104 can execute threads 502, 504, 506, and 508 concurrently. Thread 502 can be referred to as a main thread. Thread 504 can be referred to as a mixer thread. Thread 506 can be referred to as a disk thread. Thread 508 can be referred to as a jack process thread. Interconnecting various ones of these threads are buffers. These buffers can be ring buffers. These buffers can also be single-producer, single-consumer; meaning that one thread writes to them and another thread reads from them. For example, a dispatch ring buffer 510 can connect the main thread 502 with the mixer thread 504, a disk ring buffer 512 can connect the mixer thread 504 with the disk thread 506, a tail ring buffer 516 can connect the disk thread 506 back to the mixer thread 504, and a jack ring buffer 514 can connect the mixer thread 504 with the jack process thread 508.

The main thread 502 receives commands to trigger new voices and manages the other threads. In an example embodiment, main thread 502 operates to dispatch voices 520 to the dispatch ring buffer 510 in response to trigger data 500. In this example, the trigger data 500 can comprise (1) an identifier for the audio sample to be triggered (e.g., a sample file number), (2) a pipe number signifying the pipe to which the triggered sample has been assigned, (3) the pitch at which the triggered sample should be played back, (4) the volume at which the triggered sample should be played back, and (5) the pan at which the triggered sample should be played back. A voice 520 is an audio object which contains data about a triggered sample. The unit 520 can maintain a defined number of voices 520 that can be populated with triggered samples as discussed below.

Figure 6A:
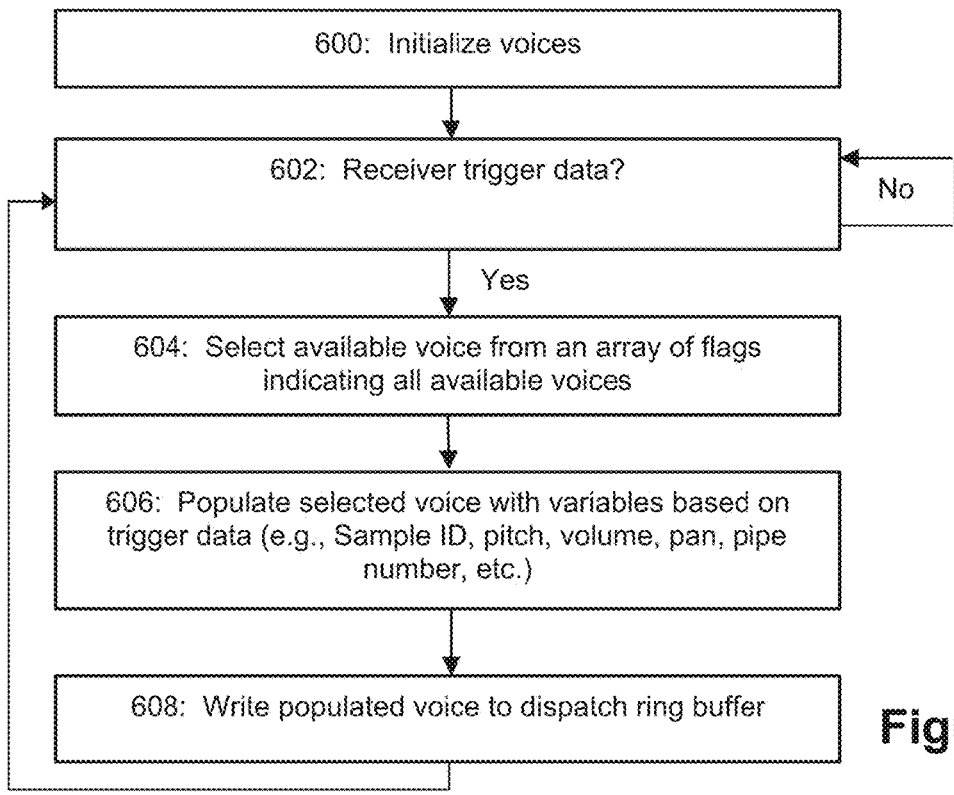
FIG. 6A depicts an example process flow for the main thread of FIG. 5.

FIG. 6A depicts an example process flow for main thread 502. At step 600, the main thread initializes the voices 520 with empty data for sample heads and tails. These dummy voices 520 do not yet contain any audio data. At step 602, the main thread checks whether trigger data has been received. If so, at step 604 the main thread selects an available voice from a dead pool array, which can be an array of flags indicating whether a given voice is available for triggering. The unit can maintain two queues of voices 520—(1) an active queue that is filled with voices 520 that have been populated with audio data and for active processing by the unit 100, and (optionally) (2) a dead pool queue that is filled with empty voices 520 that are available for population. As mentioned, step 604 selects an available voice 520 from the dead pool array, but a queue structure could be used instead if desired by a practitioner. At step 606, the main thread populates the selected voice 520 with variables based on the sample defined by the received trigger data. Thus, the selected voice 520 can be populated with (1) a sample identifier for the triggered sample, (2) a pipe number to which the selected voice 520 will be assigned, (3) the pitch at which the triggered sample should be played back, (4) the volume at which the triggered sample should be played back, and (5) the pan at which the triggered sample should be played back. At step 608, the populated voice is written to the dispatch ring buffer 510, and the process flow returns to step 602.

Thus, it should be understood that as a result of the execution of the main thread 502, the dispatch ring buffer will be populated with voices 520, where each voice 520 is populated with information about an audio sample to be played.

Figure 6B:
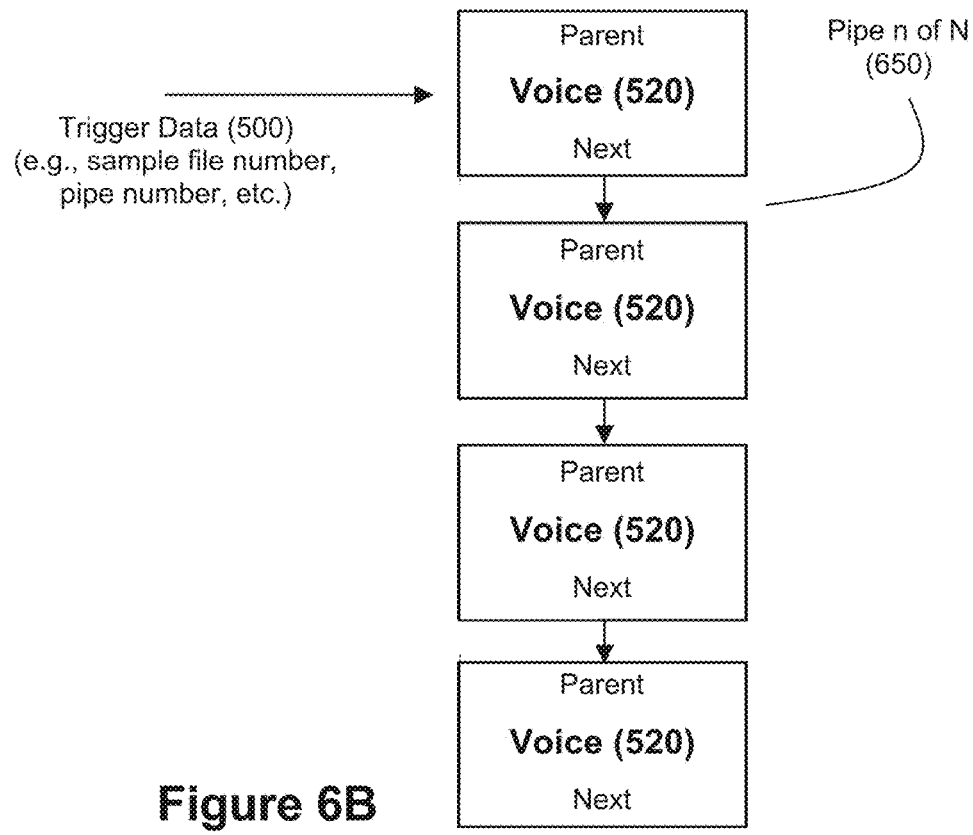
FIG. 6B depicts an example of how voices can be linked in a pipe.

Voices 520 can be chained together in a sequential order to define a pipe, where the pipe is a linkage of one voice 520 to the next voice 520 in a sequence. FIG. 6B shows an example pipe 650 (among N pipes supported by the unit 100). As new trigger data 500 comes in, a voice 520 is populated with data about the triggered sample, and each voice 520 can also identify a next voice and a parent voice to define the sequential order of voices for the subject pipe. The pipes 650 supported by the unit are thus filled with voices 520 that are linked together in a defined order, and these pipes 650 serve as an audio route tree for the unit 100. The audio route tree defines an arrangement of ordered audio samples to be played by the unit.

Figure 7:
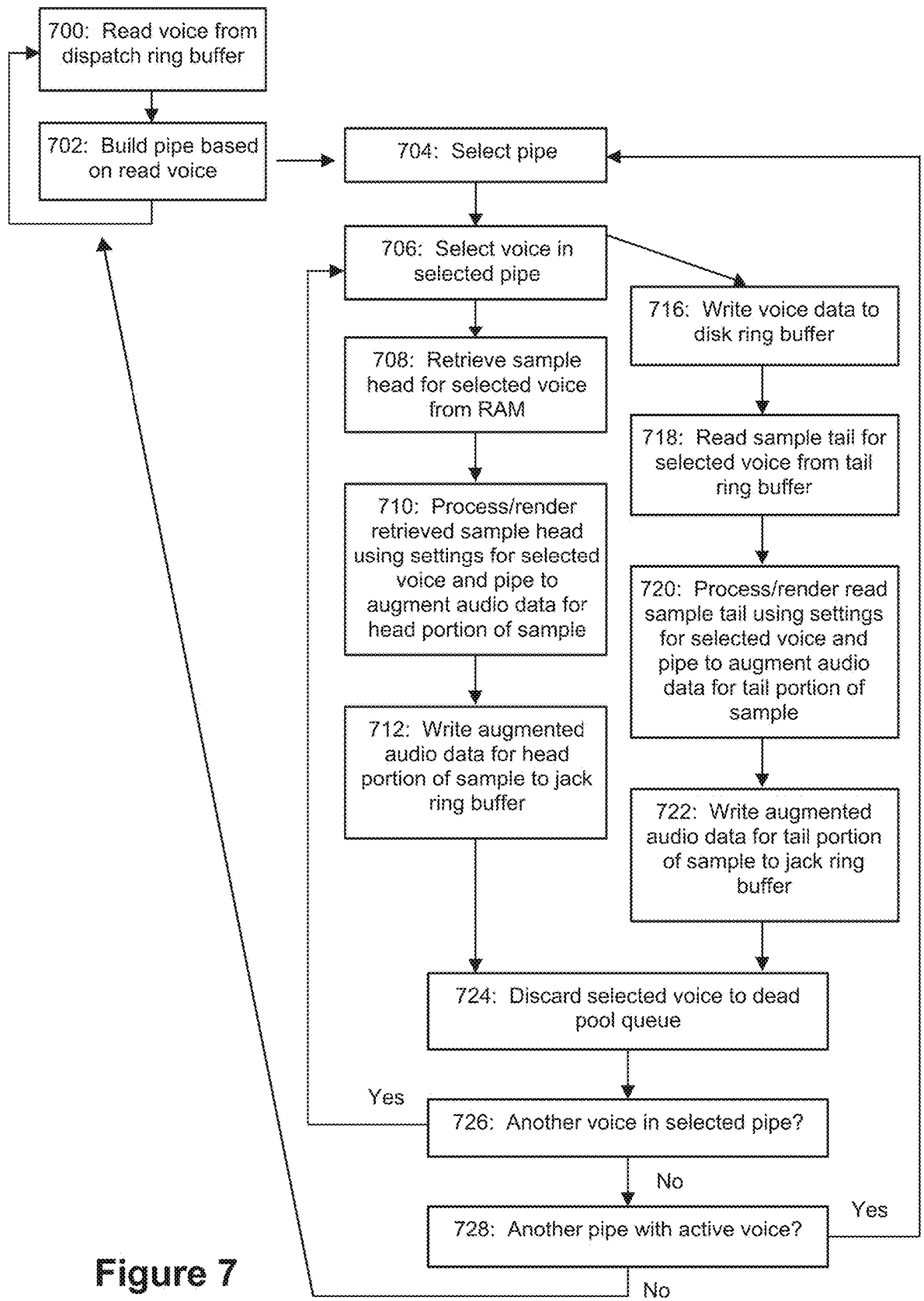
FIG. 7 depicts an example process flow for the mixer thread of FIG. 5.

The mixer thread 504 operates to read voice data from the dispatch ring buffer 510, access samples in memory 106, and mix together active audio data for subsequent output. In effect, it evaluates the audio route tree, pulls audio samples from active voices for each pipe, applies effects and mixes audio together. The mixer thread 504 can also read new active voices from the dispatch ring buffer 510 and discard inactive voices into the dead pool queue. FIG. 7 depicts an example process flow for the mixer thread.

At step 700, the mixer thread reads a voice 520 from the dispatch ring buffer. The mixer thread then builds a pipe based on the read voice 520 (step 702). Voices 520 can be read from the dispatch ring buffer on a first in first out (FIFO) basis. Also, steps 700 and 702 can iteratively repeat as new voices 520 become available in the dispatch ring buffer 510. As voices are added to a pipe, the current voice is associated with a pointer to the previous voice in that pipe, and the previous voice in that pipe is associated with a pointer to the current voice in that pipe (as in a doubly-linked list). This produces pipes in the form of one or more chains of incoming voices.

At step 704, the mixer thread selects a pipe. The pipe selection can proceed in an incremental fashion where the mixer thread starts at pipe 1 and progresses through pipe N in a round robin fashion.

At step 706, the mixer thread selects a voice in the selected pipe. The voice selection can also proceed in an incremental fashion where the mixer thread starts with the oldest voice 520 in the pipe and progresses through newer voices 520 according to the defined sequence of the selected pipe (see FIG. 6B).

Once the voice 520 has been selected at step 706, the mixer thread can start retrieving the head and tail for the sample corresponding to the selected voice from the high speed memory. These operations can leverage the high speed memory and low speed memory as discussed above.

At step 708, the mixer thread retrieves the relevant sample head from RAM for the selected voice 520. This retrieval can look up the sample head based on the sample identifier included in the selected voice. At step 710, the mixer thread processes/renders the retrieved sample head using the settings for the selected voice 520 and the selected pipe to control audio characteristics of the sample playback. If both the voice and pipe have associated settings, step 710 can sum these settings to produce the resultant data. If there are limits associated with a subject setting, and the sum either exceeds an upper limit or falls below a lower limit, the corresponding upper limit or lower limit value could be used. At this point, the audio for the processed sample head can be mixed together with any other active audio that is being played by the unit 100 at that time to produce augmented audio data. It should be understood that each sample will have a certain duration, and not all samples may share the same duration. Thus, when a new sample is triggered, the unit 100 may still be playing back a residual portion of a previous sample when starting playback of the new sample. Accordingly, step 710 may include adding the audio for the new sample to the existing audio to be played back. Separate buffers can store portions of all audio samples that are active at a given time and from which the resultant audio will be mixed. At step 712, the mixer thread writes the augmented audio data for the head portion of the triggered sample to the jack ring buffer 514.

While steps 708-712 are being performed, the mixer thread can also perform steps 716-722 to process the sample tail. At step 716, the mixer thread writes data about the selected voice 520 to the disk ring buffer 512 (e.g., writing the sample identifier to the disk ring buffer 512). At this point, the mixer thread will wait for the disk thread 506 to return the tail for the subject sample. Once such tail is available in the disk ring buffer 512, the mixer thread will read the sample tail for the selected voice from the disk ring buffer 512 (step 718). Then, at step 720, the mixer thread processes/renders the retrieved sample tail using the settings for the selected voice 520 and the selected pipe to control audio characteristics of the sample playback. This step 720 can perform mixing as discussed above for step 710 except with respect to the audio tail rather than the audio head. At step 722, the mixer thread writes the augmented audio data for the tail portion of the triggered sample to the jack ring buffer 514. As discussed above, it is expected that the path for steps 716-722 will take longer to complete than path for steps 708-712, so by pre-positioning the sample heads in high speed memory, the unit 100 is able to perform sample playback at lower latency than would be the case if no sample head pre-positioning were employed.

If the processor 104 has completed the processing of the sample head prior to the tail becoming available for processing, the processor can report an underrun error and an audible digital clicking will likely result. Alternatively, the processor may repeat/loop the sample head at steps 710 and 712 until such time as the tail becomes available.

At step 724, the mixer thread discards the selected voice to the dead pool queue to make it available to the main thread 502 for a newly triggered sample. Then, at step 726, the mixer thread checks whether there is another voice in the selected pipe. If so, the mixer thread returns to step 706 and selects the next voice 520 in the selected pipe. If not, the mixer thread proceeds to step 728. At step 728, the mixer thread checks whether there is another pipe with an active voice. If so, the mixer thread returns to step 704 and selects the next pipe with an active voice. If not, the mixer thread awaits a new pipe from steps 700-702.

Figure 8:
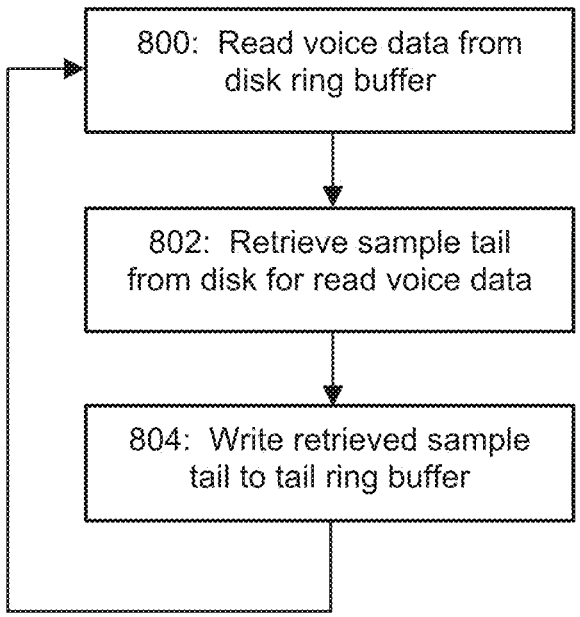
FIG. 8 depicts an example process flow for the disk thread of FIG. 5.

The disk thread 506 operates to retrieve tails from the disk that correspond to the triggered samples of the voices 520 in the disk ring buffer 512. These retrieved tails are then passed back to the mixer thread 504. FIG. 8 depicts an example process flow for the disk thread 506. At step 800, the disk thread reads voice data from the disk ring buffer 512. This voice data can include a sample identifier. The disk thread 506 can read voice data from the disk ring buffer on a FIFO basis. At step 802, the disk thread 506 retrieves the sample tail corresponding to the read voice data from the disk. This retrieved tail is then written to the tail ring buffer 516 and read by the mixer thread (see step 718 from FIG. 7). It should be understood that in an alternative embodiment, a practitioner may choose to combine the disk ring buffer 512 and tail ring buffer 516 as a single buffer for holding incoming voice data and outgoing tails.

Figure 9:
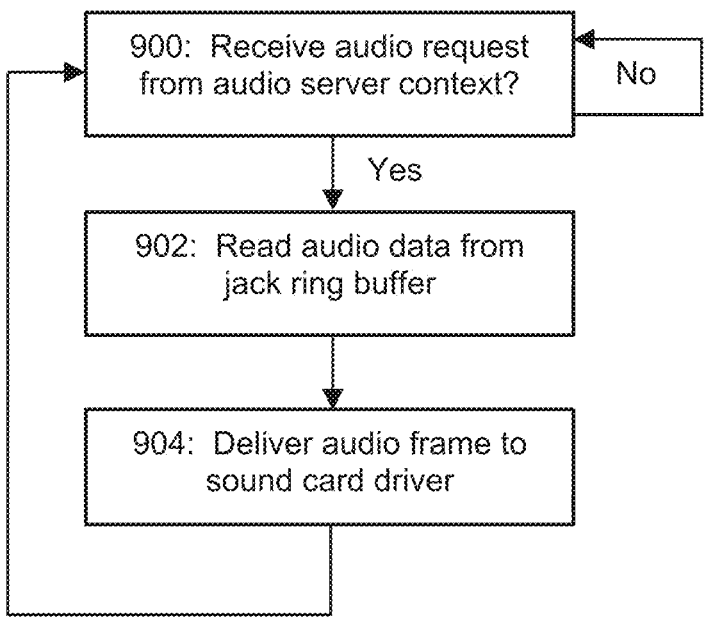
FIG. 9 depicts an example process flow for the jack process thread of FIG. 5.

The jack process thread 508 operates to create audio frames 114 from the summed/mixed audio data in the jack ring buffer 514. FIG. 9 depicts an example process flow for the jack process thread 508. At step 900, the jack process thread receives an audio request from an audio server context. At step 902, the jack process thread reads audio data from the jack ring buffer, frames it, and provides the audio frame 114 to a driver for the sound card 108.

Through the main thread 502, mixer thread 504, disk thread 506, and jack process thread 508, the processor 104 is able to quickly navigate an audio route tree of samples, stream those audio samples through a mixing process, and robustly produce audio that is responsive to user input.

Also, the inventors note that to provide stereo sound, each audio sample can have a left sample and a right sample, and the operations described herein can be performed for both the left and right samples.

Figure 10A:
FIG. 10A depicts an example operational pathway for an example embodiment of an audio sample playback unit.
Figure 10B:
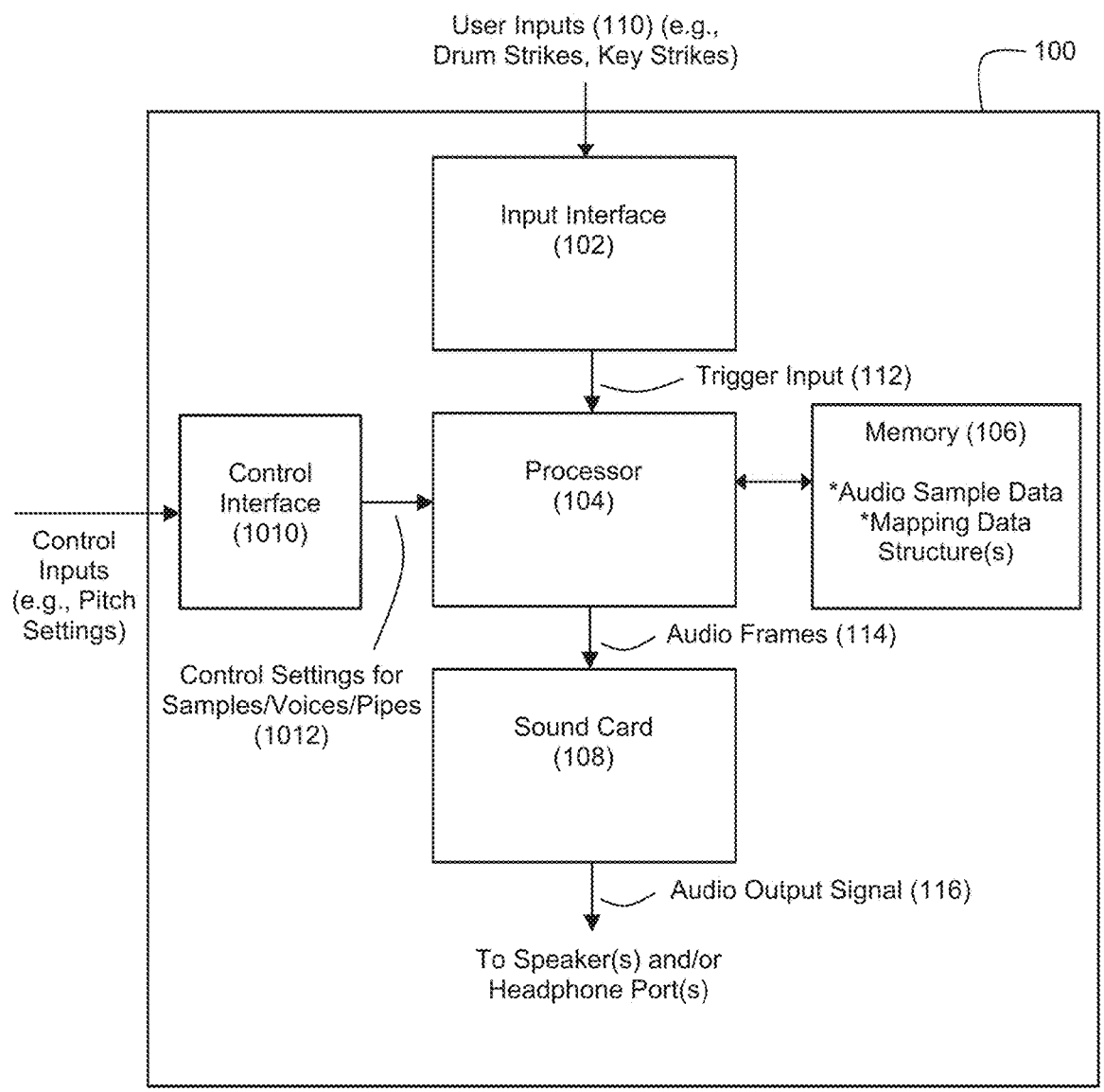
FIG. 10B discloses an example audio sample playback unit in accordance with another example embodiment.

In another example embodiment, the unit 100 can provide for enhanced control over audio sample playback via adjustable controls, which can be referred to as "tweakers". FIG. 10A depicts an example operational pathway for a unit 100 that permits users to selectively tweak the audio characteristics of the audio output. The triggered samples are run through a set of tweakers that controllably adjust and condition the audio samples to create the digital audio files that have audio effects applied to them for the creation of the audio output. FIG. 10B depicts an example embodiment of such a unit 100 where a control interface 1010 interfaces the processor 104 with various control inputs to define control settings for voices and/or pipes. The control interface 1010 can take the form of user interface such as dials, knobs, buttons, switches, and/or virtual controls presented on a GUI such as a touchscreen GUI. Through the control interface 1010, control inputs regarding audio settings such as pitch, pan, etc. can be received. If the unit 100 supports different libraries of sounds files for different instruments (e.g., a set of sound files for replicating Drum Type A, a set of sound files for replicating Drum Type B, a set of sound files for replicating Keyboard Type C, etc.), the control input can also define an instrument mode for the unit 100 by selecting one of the sound libraries for use as the source of audio samples. Through the control interface 1010, each pipe and/or voice can have individually-controlled audio properties, such as volume, pan, pitch, tweakers, and other audio effects.

A subset of these adjustable controls can define input signal conditioning for various different existing musical controllers so that such musical controllers can be easily connected with the unit 100 for seamless operation. Such a subset of adjustable controls can be referred to as "conditioners". Thus, the control inputs can also be instructions from peripherals such as musical controllers to condition the audio sounds produced by the unit.

Figure 11:
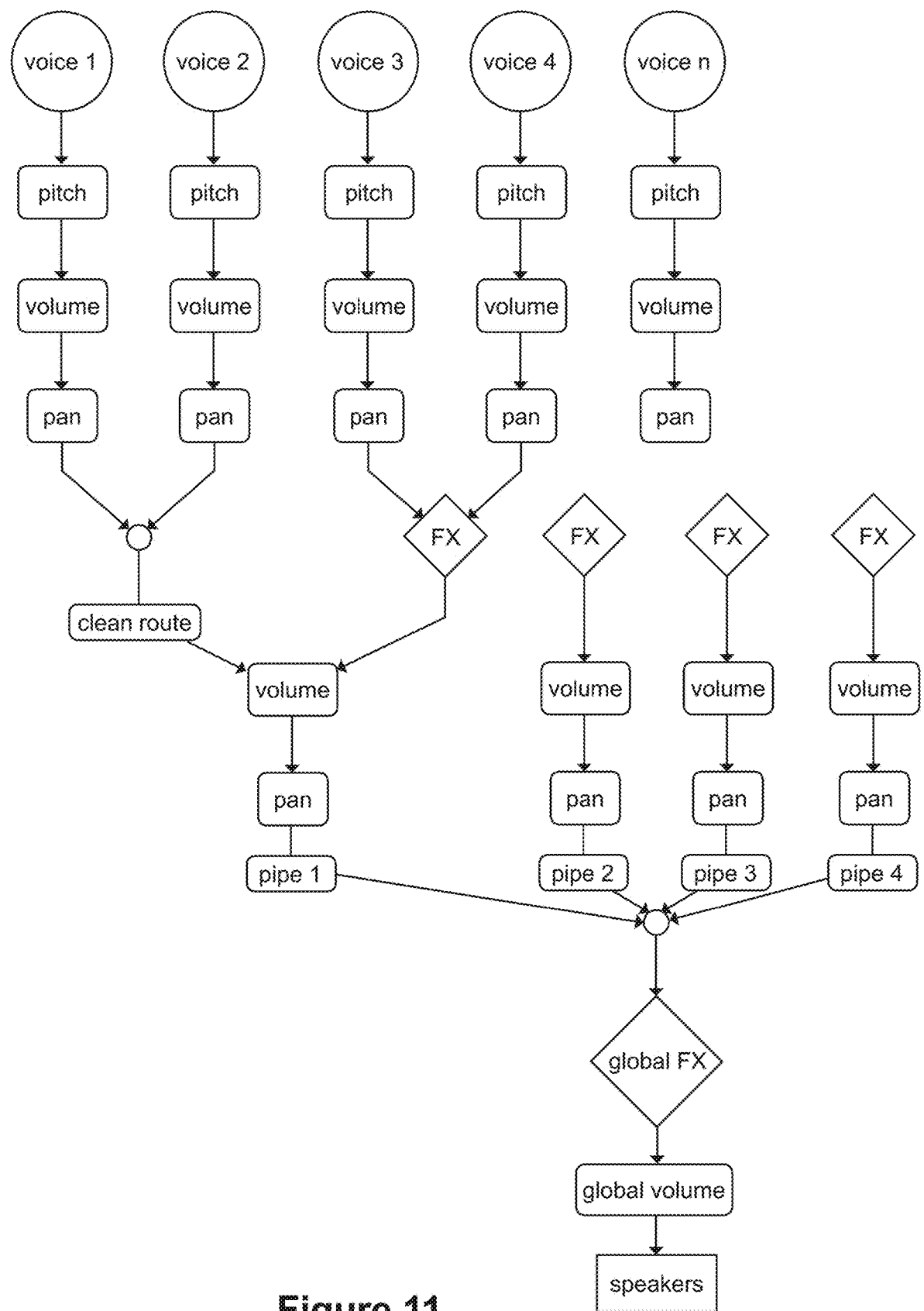
FIG. 11 discloses an example sound mixing arrangement with respect to an example set of voices and pipes.

FIG. 11 discloses an example sound mixing arrangement with respect to an example set of voices and pipes, where this sound mixing arrangement can be controlled in part based on the control inputs received via the control interface 1010 of FIG. 10B. The sound mixing operations of FIG. 11 can be performed as parts of steps 710 and 720 of FIG. 7. In this example, the unit supports 4 pipes, where pipe 1 supports 4 linked voices. However, it should be understood that more or fewer voices could be supported if desired by a practitioner (e.g., see voice n). Each voice can have its audio data controlled with the voice-specific control settings for characteristics such as pitch, volume, and pan (via the populated control variables for the voices 520). In the example of FIG. 11, Voices 1 and 2 have a clean route in Pipe 1 where no pipe-specific effects are applied to Voices 1 and 2. However, for Voices 3 and 4, pipe-specific effects can be applied to those voices as shown by the FX operation in the processing pipeline for Voices 3 and 4 in FIG. 11.

FIG. 11 also shows an example where Pipes 2-4 apply audio effects to the resultant audio, but without any voices. After the audio data from each pipe has been summed together via a mixing operation, the summed audio data has global FX and global volume settings applied to it, where such global FX and global volume settings can be controlled by a user through the control interface 1010.

Thus, it can be seen from FIG. 11 that the ability to independently control audio properties for both voices and pipes, as well as global controls, provides users with tremendous flexibility for controlling the sonic character of audio output so that unit 100 is able to produce rich sounds desired by a user.

Figure 12A:
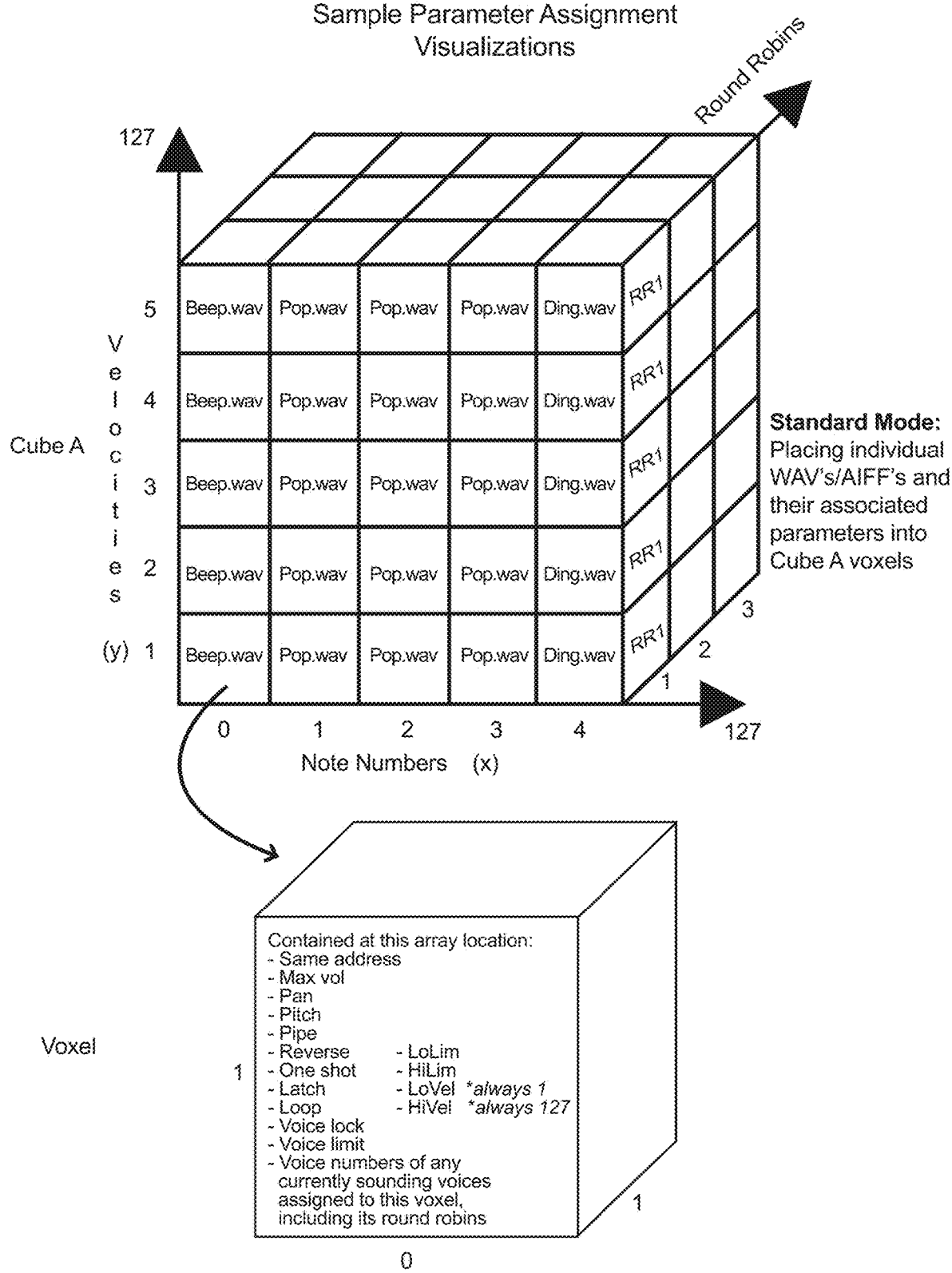
FIGS. 12A-C disclose example visualizations of how audio samples can be mapped to multiple dimensions.
Figure 12B:
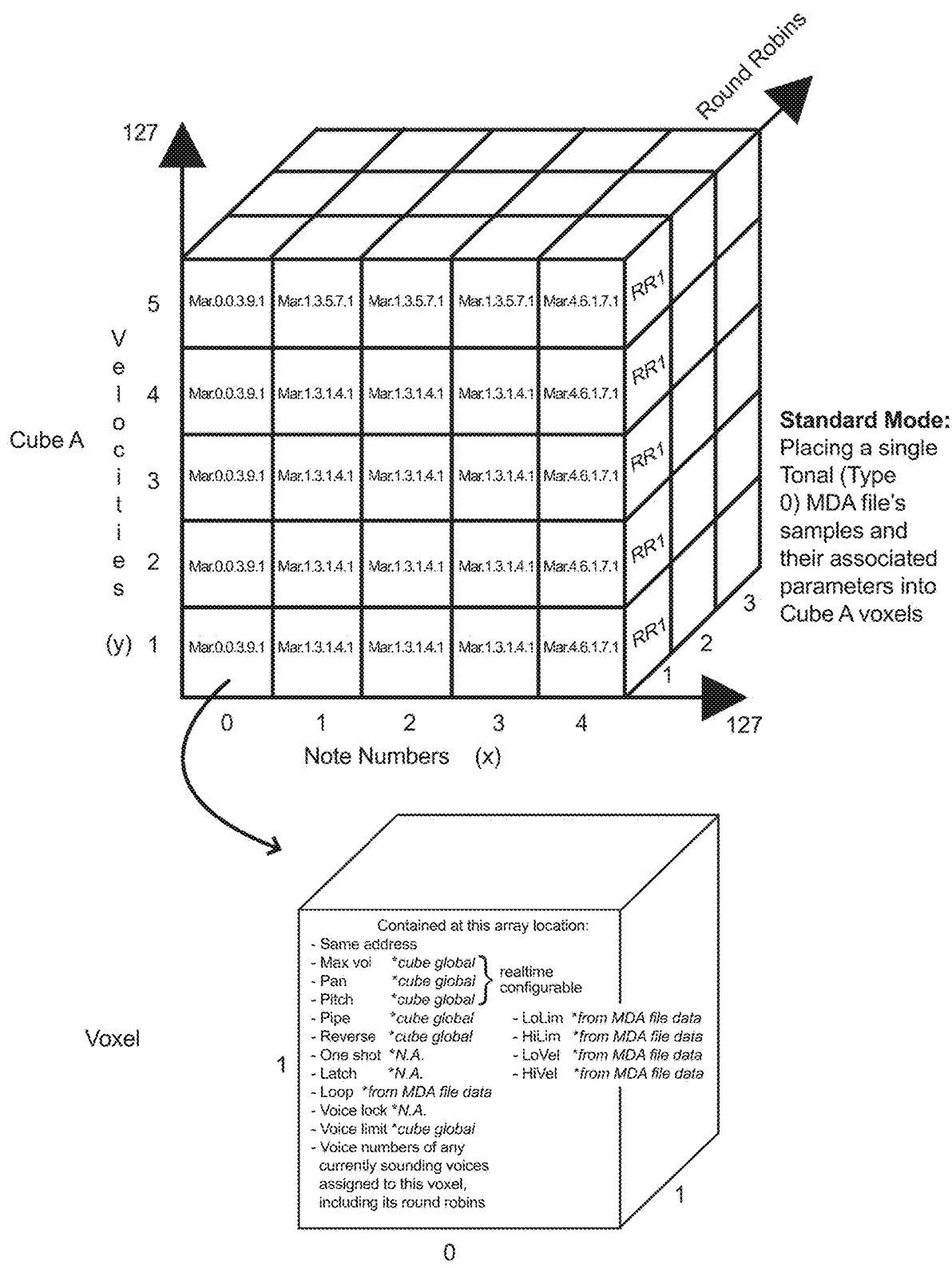
Figure 12C:
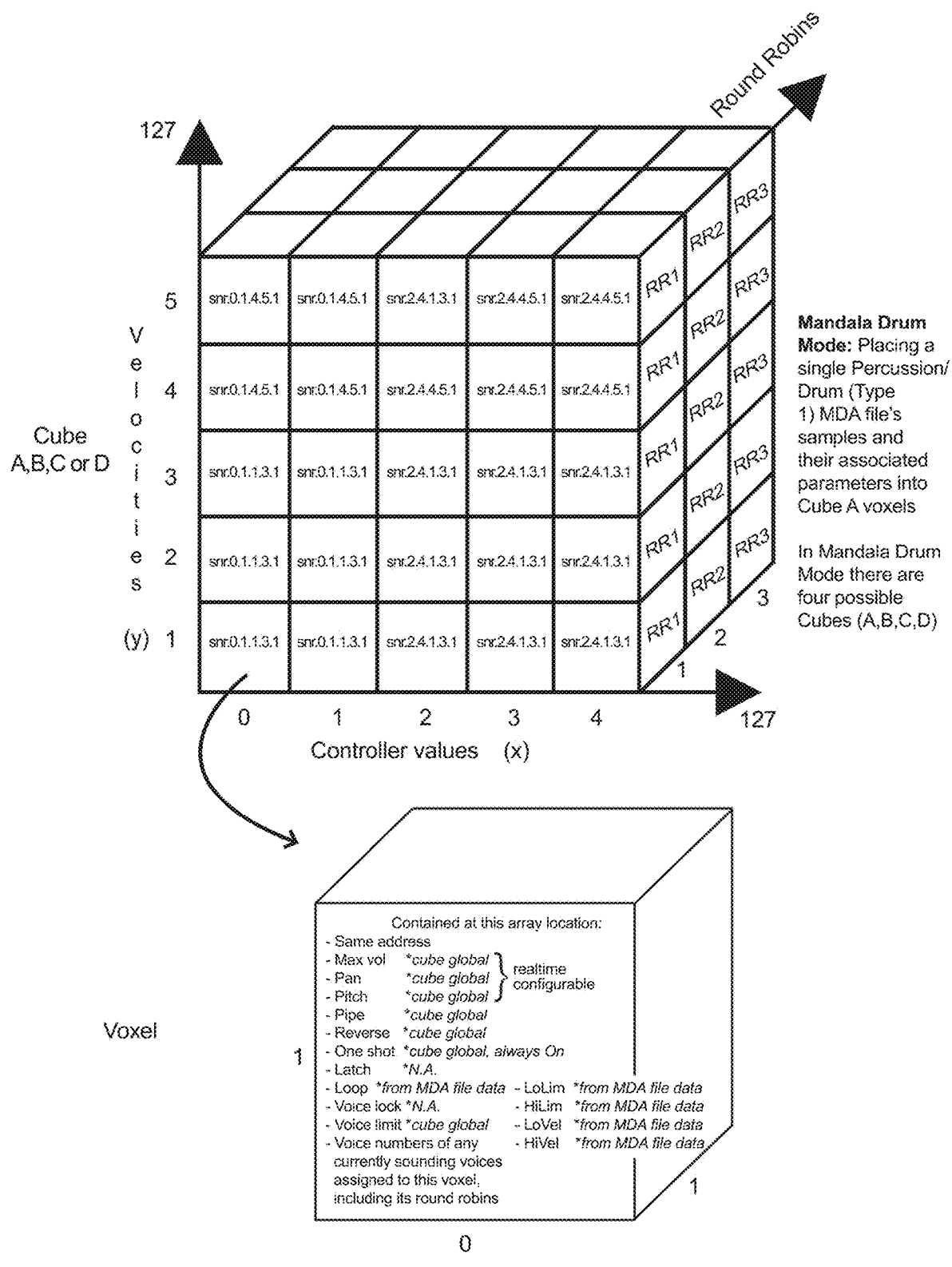

FIGS. 12A-12C show examples of multi-dimensional mapping data structures where the sample metadata can include control variables to be applied to the voices. These mapping data structures can have a digital container file format, and can be referred to as a multi-dimensional array (MDA) The MDA can also include the audio samples as well as the metadata for the audio samples. As indicated above, audio samples can be mapped to various parameters that serve as dimensions in the MDA. In the example of FIGS. 12A-12C, audio samples are mapped across a "note number" dimension and a "velocity" dimension (e.g., MIDI note numbers and MIDI velocities). To provide yet more realism, the audio samples can also be mapped across a third dimension that serves as a variability dimension, referred to as a round robin parameter. Each audio sample sharing the same x, y dimensions can be repeated in the round robin "z" dimension with a slight variation of its audio properties. When selecting an audio sample for given x, y trigger values, the unit can also select a round robin value for the sample selection so that a repeated triggering of the same sample at the x, y location will not produce the exact same sound because the system will iterate or otherwise transition through the round robin versions of the subject sample (e.g., randomly selecting a round robin version of the sample each time the subject sample is triggered).

Each sample voxel in the array can include data about the subject audio sample, such as (1) the sample's address in memory 106, (2) a max volume (which can be realtime configurable by way of incoming MIDI data or other means such as a UI-generated low frequency oscillator (LFO) signal and others, (3) a pan (which can also be realtime configurable), (4) a pitch (which can also be realtime configurable), (5) a pipe number for the sample, (6) a reverse setting which can serve as an indicator for whether an audio sample should be played front to back or back to front (where reverse "on" can mean that it plays back to front), (7) a one shot setting which can serve as an indicator for whether an audio sample should play all the way through to completion even if its voice receives an "off" message while it is playing, (8) a latch setting which can serve as an indicator for playing an audio sample when its trigger is received and stopping the playing of that sample if that trigger is received again before the sample is done playing, (9) a loop setting which can serve as an indicator for playing a sample over and over while its trigger remains engaged, (10) a voice lock setting which can indicate whether a voice is to be killed by way of the system reaching its maximum number of concurrently sounding voices (where a voice lock "on" means that the system will find a different voice to kill if the max voice limit is reached), (11) a voice limit setting which can indicate a maximum number of voices that can sounding at the same time (which, if desired by a user, can be a value less than the system default maximum number of voices), (12) an identification of the voice numbers of any currently sounding voices assigned to this voxel, including its round robins, (13) a LoLim setting which can represent the low note or low controller setting assigned to a sample that will trigger that sample if it is input into the system, (14) a HiLim setting which can represent the high note or high controller setting assigned to a sample that will trigger that sample if it is input into the system, (15) a LoVel setting, and (16) a HiVel setting (where the LoVel and HiVel settings represent the range of velocities that a sample is assigned to within its LoLim and HiLim settings such that a sample will be triggered at its velocity level when an appropriate signal (one that is within the LoLim and HiLim assigned to that particular sample is input into the system).

FIG. 12A depicts a standard mode MDA where audio sample identifiers and their associated parameters are placed into array voxels. The file for this MDA is labeled as Cube A in FIG. 12A. The names and shadings on the voxels identify each voxel's corresponding sample. In this example, it can be seen that there are 3 samples (Beep.wav, Pop.wav, and Ding.wav), although it should be understood that much larger numbers of samples could be used. The names and shadings show how the various samples can be spread over a range of trigger parameters. FIG. 12B depicts a standard mode where identifiers for single tonal audio samples and their associated parameters are placed into array voxels. A single tonal MDA is an MDA made from samples of a tonal instrument such as a piano (as opposed to a percussive instrument such as a drum, whose samples are percussive rather than tonal). FIG. 12C depicts a mandala drum mode where identifiers for single percussion/drum audio samples and their associated parameters are placed into array voxels. In a Mandala Drum mode, there can be four possible MDAs (or cubes in this example). Each MDA can include different samples to adjust the nature of percussive sounds produced by the unit.

Figure 13:
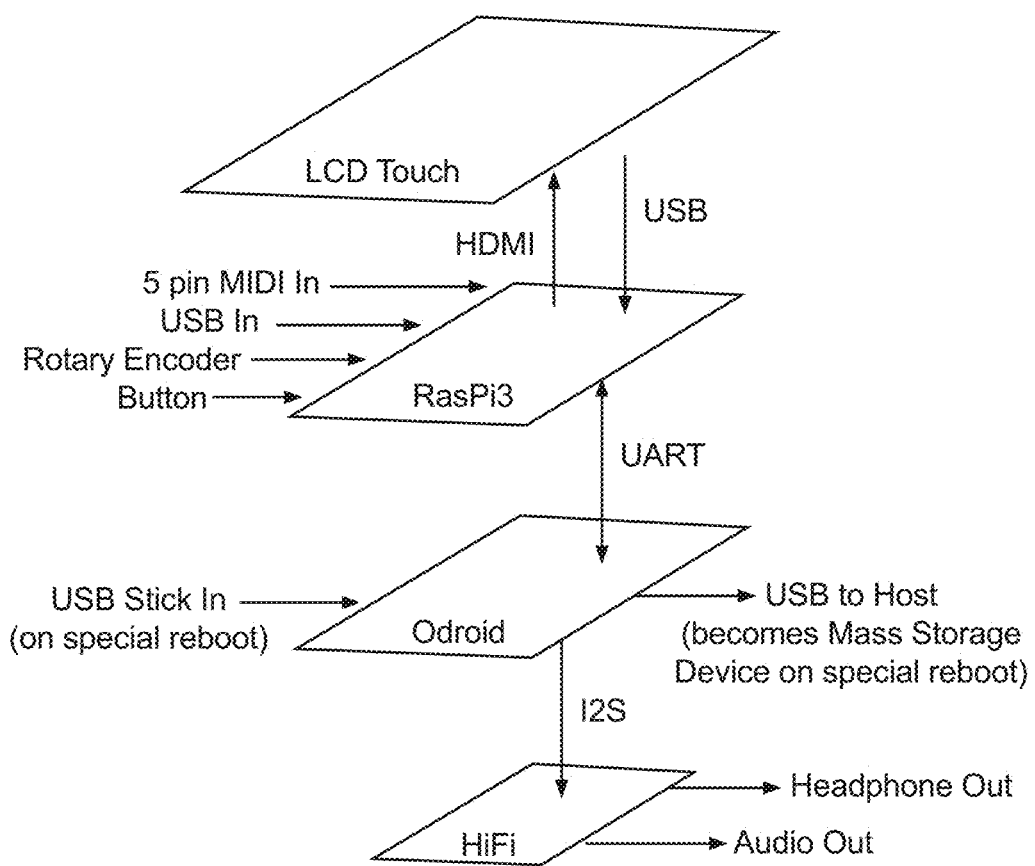
FIG. 13 discloses an example hardware arrangement for an example audio sample playback unit.

FIG. 13 discloses an example hardware arrangement for the audio sample playback unit 100, although it should be understood that different hardware arrangements could be employed. In this example, the unit's main hardware can be deployed on two single board computers (SBCs)—one SBC can be used for the input interface 102 and associated input data handling, and the other SBC can be used for audio generation by the processor 104. In an example embodiment, code on the interface SBC can be open source, while code on the audio SBC can be proprietary non-open source. FIG. 13 shows an LCD touchscreen for connection with an SBC which, in this example, can take the form of an RasPi3 board. The interface between the LCD touchscreen and the RasPi3 board can be via HDMI and USB as shown in FIG. 13. External inputs to the RasPi3 board can be a 5 pin MIDI input, a USB input, one or more rotary encoders, and one or more buttons. The audio SBC can be embodied by an Odroid board that connects with the RasPi3 board via Ethernet or UART. External inputs to the Odroid board can include a USB input. The Odroid board can also include an output such as a USB to host connection as shown in FIG. 13. The Odroid board can also connect to a HiFi board via I2S, and through the HiFi board, audio signals can be provided to headphones or speakers via appropriate output ports.

FIG. 14 shows an example voice structure, struct voice_t, for an active voice. Its properties such as pitch, pan, and volume can be created by a sample dispatcher such as sample_dispatcher( ) shown by FIG. 15. Through the sample dispatcher, each voice can be assigned to a pipe, which in this example can be one of 4 pipes. Each pipe can have a clean route and an FX route. The active effects for each pipe can be assigned using a structure such as struct_fx_list_t as shown by FIG. 16.

The inventors note that a practitioner can employ any of a number of techniques to assign triggered samples to voices and assign voices to pipes. For example, as disclosed above, the mapping data structures can associate audio samples with specific pipes. Given that each pipe can have its own associated set of audio controls, this means that a practitioner can assign a sample to a pipe that has a desired set of audio properties for the subject audio sample. As another example, the trigger data 500 can include a pipe number that will be assigned to a triggered audio sample. In such a case, another mapping data structure could be employed that maps pipes to trigger parameters to govern which pipes get selected in response to which triggers. Similarly, a program routine could be designed to increment a pipe number for each new trigger in a loop of pipe numbers. As to voices, triggered samples can be assigned to available voices 520 on a first come first serve basis if desired by a practitioner. But, it should be understood that triggered samples could be assigned to voices under an alternative management control to achieve certain results desired by a practitioner. A voice number to use could also be included in the trigger data.

While the invention has been described above in relation to its example embodiments, various modifications may be made thereto that still fall within the invention's scope. Such modifications to the invention will be recognizable upon review of the teachings herein.

What is claimed is:

1. An audio sample playback apparatus comprising:
a memory configured to store (1) a plurality of audio samples and (2) a mapping data structure for the audio samples, the mapping data structure configured to associate the audio samples with at least one trigger parameter; and
a processor configured to (1) maintain a plurality of pipes of audio samples, (2) receive trigger inputs, (3) for each of a plurality of the received trigger inputs, (i) determine at least one trigger parameter from the received trigger input, (ii) access the mapping data structure to identify a triggered audio sample associated with the determined at least one trigger parameter, and (iii) retrieve the identified triggered audio sample from the memory, (4) assign each of a plurality of the triggered audio samples to a pipe selected from among the pipes, and (5) generate a plurality of audio frames based on the triggered audio samples assigned to the pipes.

2. The apparatus of claim 1 wherein the mapping data structure comprises a multi-dimensional array that associates the audio samples with a plurality of trigger parameters; and
wherein the processor is further configured to (1) determine a plurality of trigger parameters from the received trigger inputs and (2) access the mapping data structure to identify the triggered audio samples associated with the determined trigger parameters.

3. The apparatus of claim 2 wherein the trigger parameters of the multi-dimensional array include a note identifier and/or a trigger velocity.

4. The apparatus of claim 2 wherein the multi-dimensional array further comprises a variance dimension for varying audio properties of an audio sample such that multiple triggers of the same audio sample for the same trigger parameters will produce sound with different audio properties.

5. The apparatus of claim 4 wherein the processor is further configured to loop through values of the variance dimension when the same audio sample is repeatedly triggered.

6. The apparatus of claim 1 wherein the mapping data structure also associates a plurality of audio control settings with each audio sample, and wherein the processor is further configured to apply the audio control settings associated with a triggered audio sample to audio frame generation for that triggered audio sample.

7. The apparatus of claim 1 wherein the mapping data structure associates the audio samples with the at least one trigger parameter via a plurality of audio sample identifiers.

8. The apparatus of claim 7 wherein the audio sample identifiers comprise memory addresses for the audio samples in the memory.

9. The apparatus of claim 1 wherein each pipe is associated with audio control settings for the pipe, and wherein the processor is further configured to apply the audio control settings associated with a pipe to audio frame generation for audio samples assigned to that pipe.

10. The apparatus of claim 1 wherein the processor is further configured to (1) maintain a plurality of voices, (2) assign triggered audio samples to voices that are available, and (3) link a plurality of voices with assigned triggered audio samples to form at least one of the pipes.

11. The apparatus of claim 10 wherein the processor is further configured to populate the voices with data about the triggered audio samples.

12. The apparatus of claim 11 wherein the populated data comprises identifiers for the triggered audio samples and audio control settings for the triggered audio samples.

13. The apparatus of claim 1 wherein the processor is configured to execute a plurality of threads concurrently to control audio sample playback in response to the received trigger inputs.

14. The apparatus of claim 1 wherein the audio samples comprise uncompressed audio files.

15. The apparatus of claim 1 wherein the audio samples comprise a plurality of libraries of audio samples for a plurality of musical instruments, and wherein the processor is further configured to select a library of audio samples for operation in response to user input.

16. An audio sample playback apparatus comprising:
a memory configured to store (1) a plurality of audio samples and (2) a mapping data structure for the audio samples, the mapping data structure configured to associate the audio samples with at least one trigger parameter; and
a processor configured to (1) receive trigger inputs and (2) for each of a plurality of the received trigger inputs, (i) determine at least one trigger parameter from the received trigger input, (ii) access the mapping data structure to identify a triggered audio sample associated with the determined at least one trigger parameter, (iii) retrieve the identified triggered audio sample from the memory, and (iv) generate an audio frame based on the retrieved triggered audio sample;
wherein the processor is further configured to execute a plurality of threads concurrently to control audio sample playback in response to the received trigger inputs, wherein the threads comprise:
a main thread;
a mixer thread;
a disk thread; and
a jack process thread;
wherein the main thread communicates with the mixer thread via a dispatch ring buffer;
wherein the mixer thread communicates with the disk thread via a disk ring buffer; and
wherein the mixer thread communicates with the jack process thread via a jack ring buffer.

17. The apparatus of claim 16 wherein the mapping data structure comprises a multi-dimensional array that associates the audio samples with a plurality of trigger parameters; and
wherein the processor is further configured to (1) determine a plurality of trigger parameters from the received trigger inputs and (2) access the mapping data structure to identify the triggered audio samples associated with the determined trigger parameters.

18. The apparatus of claim 17 wherein the trigger parameters of the multi-dimensional array include a note identifier and a trigger velocity.

19. An audio sample playback apparatus comprising:
a memory configured to store (1) a plurality of audio samples and (2) a mapping data structure for the audio samples, the mapping data structure configured to associate the audio samples with at least one trigger parameter; and
a processor configured to (1) receive trigger inputs and (2) for each of a plurality of the received trigger inputs, (i) determine at least one trigger parameter from the received trigger input, (ii) access the mapping data structure to identify a triggered audio sample associated with the determined at least one trigger parameter, (iii)

retrieve the identified triggered audio sample from the memory, and (iv) generate an audio frame based on the retrieved triggered audio sample;

wherein the processor is further configured to execute a plurality of threads concurrently to control audio sample playback in response to the received trigger inputs, wherein the threads include a thread configured to (1) receive trigger data, (2) determine which of the audio samples have been triggered based on the mapping data structure as applied to the received trigger data, (3) populate voices with data about the triggered audio samples, and (4) dispatch the populated voices to a buffer.

20. The apparatus of claim 19 wherein the threads include another thread configured to (1) read populated voices from the buffer, (2) coordinate a retrieval of the triggered audio samples from the memory based on the populated voices, (3) mix the retrieved triggered audio samples with other active audio, and (4) write the mixed audio to a second buffer.

21. The apparatus of claim 20 wherein the threads include yet another thread configured to (1) read mixed audio from the second buffer and (2) create and deliver a plurality of audio frames to a sound card based on the read mixed audio.

22. The apparatus of claim 20 wherein the memory comprises a first memory configured to store a plurality of heads for the audio samples and a second memory configured to store a plurality of tails for the audio samples; and wherein the another thread is configured to (1) access the first memory based on data within the read populated voices to retrieve the heads for the triggered audio samples and (2) write data from the read populated voices to a third buffer to initiate retrieval of the tails for the triggered audio samples from the second memory.

23. The apparatus of claim 22 wherein the threads include yet another thread configured to (1) read data from the third buffer, (2) retrieve tails from the second memory based on the data read from the third buffer, and (3) write the retrieved tails to the third buffer for delivery to the another thread.

24. The apparatus of claim 19 wherein the mapping data structure comprises a multi-dimensional array that associates the audio samples with a plurality of trigger parameters; and wherein the processor is further configured to (1) determine a plurality of trigger parameters from the received trigger inputs and (2) access the mapping data structure to identify the triggered audio samples associated with the determined trigger parameters.

25. The apparatus of claim 24 wherein the trigger parameters of the multi-dimensional array include a note identifier and a trigger velocity.

* * * * *